(12) United States Patent
Haraguchi et al.

(10) Patent No.: US 9,360,922 B2
(45) Date of Patent: Jun. 7, 2016

(54) DATA PROCESSING SYSTEM, MICROCONTROLLER AND SEMICONDUCTOR DEVICE

(71) Applicant: Renesas Electronics Corporation, Kanagawa (JP)

(72) Inventors: Masaru Haraguchi, Kanagawa (JP); Isamu Hayashi, Kanagawa (JP); Hiroyuki Kawai, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 14/500,110

(22) Filed: Sep. 29, 2014

(65) Prior Publication Data
US 2015/0095684 A1    Apr. 2, 2015

(30) Foreign Application Priority Data

Sep. 30, 2013    (JP) .................. 2013-204650

(51) Int. Cl.
*G11C 5/14*    (2006.01)
*G06F 1/32*    (2006.01)

(52) U.S. Cl.
CPC ............ *G06F 1/3243* (2013.01); *G06F 1/3275* (2013.01); *G06F 1/3287* (2013.01); *Y02B 60/1225* (2013.01); *Y02B 60/1228* (2013.01); *Y02B 60/1239* (2013.01); *Y02B 60/1282* (2013.01); *Y02B 60/32* (2013.01)

(58) Field of Classification Search
CPC ................................. G11C 7/222; G11C 5/14
USPC ............................................ 365/226, 189.05
See application file for complete search history.

(56) References Cited

U.S. PATENT DOCUMENTS

| | | | | |
|---|---|---|---|---|
| 4,328,558 A * | 5/1982 | Musa | ................. | G11C 8/18 327/18 |
| 5,128,996 A * | 7/1992 | Rosenow | .............. | G07F 7/1016 235/380 |
| 5,574,688 A * | 11/1996 | McClure | ................ | G11C 29/84 365/200 |
| 5,706,413 A * | 1/1998 | Takabayashi | ......... | G06F 3/1297 358/1.11 |
| 5,930,358 A * | 7/1999 | Rao | ........................ | G06F 3/0607 360/133 |
| 8,675,059 B2 * | 3/2014 | Johnson | ............. | G06K 9/00369 340/541 |
| 2007/0288683 A1* | 12/2007 | Panabaker | .............. | G06F 12/06 711/101 |

FOREIGN PATENT DOCUMENTS

JP    2007-164822 A    6/2007

* cited by examiner

*Primary Examiner* — Michael Tran
(74) *Attorney, Agent, or Firm* — McDermott Will & Emery LLP (57) ABSTRACT

In order to perform easily power cutoff of a device configuring a data processing system and to improve the power reduction effect at standby, the data processing system is configured with a microcontroller, a memory IC including a nonvolatile RAM array, and a power supply unit capable of controlling the power supply to the microcontroller and the memory IC, separately. When a control signal to control read and write of data to the nonvolatile RAM array is at a high level, the memory IC is enabled read and write of data to the nonvolatile RAM array. When the control signal is at a low level, the memory IC is disenabled read and write of data to the nonvolatile RAM array. The microcontroller sets the control signal at a low level, when the memory IC is shifted to a standby state by the power supply unit.

13 Claims, 8 Drawing Sheets

DATA PROCESSING SYSTEM, MICROCONTROLLER AND SEMICONDUCTOR DEVICE

CROSS-REFERENCE TO RELATED APPLICATIONS

The present application claims priority from Japanese Patent Application JP 2013-204650 filed on Sep. 30, 2013, the content of which is hereby incorporated by reference into this application.

BACKGROUND

The present invention relates to a data processing system, a microcontroller, and a semiconductor device, in particular, relates to technology which is effective when applied to the data processing system requiring low power consumption.

A data processing system, such as a mobile terminal and a server, is configured by mutually coupling plural electronic parts, such as a microcontroller, a memory, a sensor, and a power IC, in order to realize a desired function. In recent years, there is an increasing demand of power saving of a data processing system. In order to realize the power saving of a data processing system, it is indispensable to suppress the power consumption of each device (for example, a semiconductor integrated circuit) which configures the data processing system.

As the power saving technology of a semiconductor integrated circuit, the technique called power gating has been attracting attention in recent years. In the technique called power gating, power supply to a non-operating circuit block of a semiconductor integrated circuit is cut off, thereby suppressing a leakage current of the circuit block concerned and reducing the power consumption of the entire semiconductor integrated circuit.

In recent years, the concept of this power gating is applied to a data processing system, and consideration is given to attaining the power saving of the entire data processing system by controlling separately the supply and cutoff of power to each device implemented in a mounting board. For example, Patent Literature 1 discloses technology of performing the power supply and power cutoff to each memory chip in a memory module provided with plural memory chips. Specifically, Patent Literature 1 discloses the technique of shifting the timing of the power supply and the power cutoff to plural memory chips with the use of a power-on control signal to instruct the power supply and the power cutoff.

However, when an SRAM and a DRAM are employed as an external memory of a microcontroller in the data processing system, it is often difficult to perform the power cutoff because these external memories are volatile. Accordingly, for attaining the further power saving, in recent years, consideration is given to the employment of a nonvolatile RAM (NVRAM), such as an MRAM and an FRAM (a registered trademark, the same in the following), in which data is not lost even if the power is cut off. By employing an NVRAM in lieu of an SRAM or a DRAM, it becomes possible to perform power cutoff of the external memory easily, therefore, the further power saving of the system can be expected.

(Patent Literature 1)
Published Japanese Unexamined Patent Application No. 2007-164822

SUMMARY

In consideration of the replacement from SRAM or DRAM products, many of NVRAM products which have appeared on the current market are provided with interface specification compatible with SRAM products. That is, in many of NVRAMs, as is the case with the ordinary SRAM and DRAM, a control signal, such as a write enable (RE) signal and an output enable (GE) signal which control the read and write of data to a memory cell, is defined as active low. Therefore, when the power is cut off and the NVRAM is placed in a standby state, it is desirable to apply a high-level signal to a write enable terminal, an output enable terminal, etc. of the NVRAM, in order to avoid occurrence of unjust memory access. However, in cases where the power of an NVRAM is cut off by turning off a power switch (an output transistor of a regulator circuit, etc.) provided for example on the power supply side of the NVRAM, when a high-level control signal is applied to a control terminal of the NVRAM, a charge will be supplied to the power supply line inside the NVRAM via an ESD protection diode coupled to the control terminal concerned. As a result, there remains an issue that, even if the power is cut off and the NVRAM is placed in a standby state, sufficient power reduction effect is not obtained in the data processing system.

A plausible technique to solve the issue is that in an active-low NVRAM, a control signal is set at a low level only at the time of the power cutoff. However, there is a possibility that simply by setting the control signal at a low level at the time of the power cutoff, an unjust memory access occurs and data of the memory cell is destroyed. Accordingly, another plausible technique is devised as follows. As in the memory chip disclosed by Patent Literature 1, the timing of the power cutoff is notified to the memory IC using a power-on control signal and a certain processing is performed so as to prevent an access to the memory cell, and after that, various kinds of control signals such as a write enable signal are set at a low level. However, according to this technique, an external terminal to input the power-on control signal to the memory IC will become necessary separately, and the processing to control the memory access using the power-on control signal will also become complicated.

Solutions to such issues will be explained in the following. The other issues and new features of the present invention will become clear from the description of the present specification and the accompanying drawings.

The following explains briefly an outline of typical embodiments to be disclosed by the present application.

That is, the data processing system is configured with a microcontroller, and a memory IC which includes a nonvolatile RAM array capable of performing read and write of data, and which is accessible by the microcontroller. The data processing system is further configured with a power supply unit capable of controlling the power supply to the microcontroller and the memory IC, separately. When a control signal to control the read and write of data to the nonvolatile RAM array is at a high level, the memory IC is enabled to perform the read and write of data to the nonvolatile RAM array. When the control signal is at a low level, the memory IC is disenabled to perform the read and write of data to the nonvolatile RAM array. The microcontroller sets the control signal at a low level, when the power supply to the memory IC is cut off by the power supply unit.

The following explains briefly an effect obtained by the typical embodiments disclosed in the present application.

That is, according to the present data processing system, it is possible to perform easily the power cutoff to the device composing the data processing system and to improve the power reduction effect at the time of standby.

DETAILED DESCRIPTION

1. Summary of Embodiments

First, an outline of a typical embodiment of the invention disclosed in the present application is explained. A numerical symbol of the drawing referred to in parentheses in the outline explanation about the typical embodiment only illustrates what is included in the concept of the component to which the numerical symbol is attached.

<1> (A Data Processing System Provided with a Microcontroller which Sets at a Low Level a Control Signal Related to a Memory Access at the Time of Standby of an Active-High Memory IC)

A data processing system (100) according to a typical embodiment of the present application is configured with a microcontroller, and a memory IC (1) which includes a non-volatile RAM array (13) capable of performing read and write of data, and which is accessible by the microcontroller. The data processing system is further configured with a power supply unit (2) capable of controlling the power supply to the microcontroller and the memory IC, separately. When a control signal (WE, OE, BE, CE) to control the read and write of data to the nonvolatile RAM array is at a high level, the memory IC is enabled to perform the read and write of data to the nonvolatile RAM array. When the control signal is at a low level, the memory IC is disenabled to perform the read and write of data to the nonvolatile RAM array. The microcontroller sets the control signal at a low level, when the memory IC is shifted to a standby state by the power supply unit.

According to this configuration, when the power supply is cut off and the memory IC is shifted to a standby state, the control signal to control the write or read of data is set at a low level. Therefore, it is possible to prevent a charge from being supplied to an internal power supply line of the memory IC via an ESD protection diode from an external terminal of the memory IC which receives the control signal concerned. Accordingly, it is possible to further reduce the consumption current of the data processing system when the power supply to the memory IC is cutoff. Since the memory IC operates not under the active-low control but under the active-high control, it is not necessary to perform complicated control to prevent the occurrence of an access to the memory cell just before cutting off the power supply to the memory IC, and it is not necessary to send to the memory IC a signal indicative of performing the power cutoff.

<2> (An Address Signal is Set at a Low Level at the Time of Standby of the Memory IC)

In the data processing system according to Paragraph 1, the microcontroller sets at a low level an address signal (ADR) to be supplied to the memory IC, when the memory IC is shifted to a standby state by the power supply unit.

According to this configuration, it is possible to prevent a charge from being supplied to an internal power supply line of the memory IC via an ESD protection diode from an external terminal of the memory IC which receives an address signal. Therefore, it is possible to further reduce the consumption current of the data processing system when the power supply to the memory IC is cut off.

<3> (an Address Output Terminal of a Microcontroller is Set to Hi-z at the Time of Standby of a Memory IC)

In the data processing system according to Paragraph 1, the microcontroller includes an address output terminal (PM5). The microcontroller supplies an address signal (ADR) to the memory IC via the address output terminal, when performing the read and write of data to the nonvolatile RAM array, and sets the address output terminal to a high-impedance state (Hi-z), when the memory IC is shifted to a standby state by the power supply unit.

According to this configuration, as is the case with Paragraph 2, it is possible to further reduce the consumption current of the data processing system when the power supply to the memory IC is cut off.

<4> (A Low Level Signal is Supplied to the Microcontroller from a Communication Interface of the Power Supply Unit at the Time of Standby of the Microcontroller)

In the data processing system according to one of Paragraph 1 through Paragraph 3, the microcontroller and the power supply unit are respectively provided with an interface unit (22, 33, 34) to communicate with the exterior with the use of a communication control signal (CLK, CE_S) and a data signal (DIN, DOUT). Each interface unit is enabled to perform transmission and reception of the data signal when the communication control signal is set at a high level at a prescribed timing, and each interface is disenabled to perform transmission and reception of the data signal when the communication control signal is set at a low level. When the microcontroller is shifted to a standby state, the power supply unit sets at a low level the communication control signal to be supplied to the interface unit of the microcontroller, and sets at a low level the data signal to be supplied to the interface unit of the microcontroller.

According to this configuration, for example, in cases where the power supply to the microcontroller is cut off, it is possible to prevent a charge from being supplied to the microcontroller via an ESD protection diode from the interface (for example, an external terminal) for communication of the microcontroller. Accordingly, it is possible to further reduce the consumption current of the data processing system when the power supply to the microcontroller is cut off.

<5> (A Low Level Signal is Supplied to a Device from the Communication Interface of the Microcontroller at the Time of Standby of the Device)

The data processing system according to Paragraph 4 is further provided with a device (5) including the interface unit and capable of performing communication with the microcontroller via the interface unit. The power supply unit is capable of controlling power supply to the device. When the device is shifted to a standby state, the power supply unit sets at a low level the communication control signal to be supplied to the interface unit of the device, and sets at a low level the data signal to be supplied to the interface unit of the device.

According to this configuration, for example, in cases where the power supply to the device is cut off, it is possible to prevent a charge from being supplied to the device via an ESD protection diode from the external terminal which configures the interface unit of the device. Accordingly, it is possible to further reduce the consumption current of the data processing system when the power supply to the device is cut off.

<6> (Details of a Control Signal of the Memory IC)

In the data processing system according to one of Paragraph 1 through Paragraph 5, the control signal includes a write enable signal (WE) to enable write of data to the nonvolatile RAM array, and an output enable signal (OE) to enable read of data from the nonvolatile RAM array. The control signal further includes a byte enable signal (BE) to enable a byte access, and a chip enable signal (CE) to enable selection of the memory IC.

<7> (A Microcontroller Provided with a Memory I/F Capable of Active-High Control)

A microcontroller (3, 6) according to a typical embodiment of the present application is provided with plural control terminals (PM1-PM4) to output plural control signals (CE, WE, OE, BE) to control the read and write of data to an external memory (1). The microcontroller is provided with a data terminal (PM6) to input or to output data (DQ), and an address terminal (PM5) to output an address signal (ADR) to specify an address of the external memory. The microcontroller is further provided with a memory interface circuit (32, 62) to access the external memory via the control terminal, the data terminal, and the address terminal. The memory interface circuit outputs the control signal at a high level when the read and write of data is performed to the external memory, and outputs the control signal at a low level when the read and write of data is stopped to the external memory. The memory interface circuit outputs the control signal at a low level when the external memory is shifted to a standby state.

According to this configuration, it is possible to perform the read and write of data to the active-high external memory. When the power supply to the external memory is cut off, for example, it is possible to prevent a charge from being supplied to the external memory via an ESD protection diode from the control signal-receiving external terminal of the external memory.

<8> (A Microcontroller Setting the Address Signal at a Low Level at the Time of Standby of the Memory IC)

In the microcontroller according to Paragraph 7, the memory interface circuit outputs the address signal at a low level from the address terminal, when the external memory is shifted to a standby state.

According to this configuration, when the power supply to the external memory is cut off, it is possible to prevent a charge from being supplied to the external memory via an ESD protection diode from the address signal-receiving external terminal of the external memory.

<9> (A Microcontroller Setting the Address Terminal at Hi-z)

In the microcontroller according to Paragraph 8, the memory interface circuit sets the address terminal to a high-impedance state, when the power supply to the external memory is cut off.

According to this configuration, as is the case with Paragraph 8, when the power supply to the external memory is cut off, it is possible to prevent a charge from being supplied to the external memory from the address signal-receiving external terminal of the external memory.

<10> (A Microcontroller Provided with a Memory I/F Capable of Switching an Active High and an Active Low)

In the microcontroller (6) according to one of Paragraph 7 through Paragraph 9, the memory interface circuit includes a control circuit (32) which outputs the control signal at a low level when the read and write of data is performed to the external memory, and outputs the control signal at a high level when the read and write of data is stopped to the external memory. The memory interface circuit includes further a logic circuit (620) provided with a first register (626). The logic circuit supplies to the control terminal a signal of a logical level opposite to the control signal outputted from the control circuit to the control terminal, when a first value ("1") is set at the first register. The logic circuit supplies to the control terminal a signal of a logical level same as the control signal outputted from the control circuit to the control terminal, when a second value ("0") different from the first value is set at the first register. The memory interface circuit outputs the control signal at a high level, when the power supply to the external memory is cut off.

According to this configuration, it is possible to support both the active-high external memory and the active-low external memory, without providing separately a memory interface for active-high control, and a memory interface for active-low control.

<11> (A Semiconductor Device Provided with an Active-High Memory Cell)

A semiconductor device (1) according to a typical embodiment of the present application is provided with a nonvolatile RAM array (13) capable of performing the write or read of data, and plural control terminals (P1-P4) to input plural control signals (CE, BE, WE, OE) to control the read and write of data to the RAM array. The semiconductor device is further provided with a data terminal (P6) to input data (DQ) to be written in the RAM array and to output data read from the RAM array, and an address terminal (P5) to input an address signal (ADR) to specify an address of the RAM array. The semiconductor device is further provided with a control unit (10) capable of performing memory access corresponding to the control signal inputted into the control terminal, to a memory cell in the RAM array specified by the address signal inputted into the address terminal. The control unit performs the memory access, when the control signal at a high level is inputted into the control terminal, and stops the memory access, when the control signal at a low level is inputted into the control terminal.

According to this configuration, it is possible to provide an active-high semiconductor device (memory IC) provided with a nonvolatile RAM array. Since the semiconductor device concerned configures an active-high memory IC, the control signal at a low level is inputted when the power supply to the semiconductor device concerned is cut off. Therefore, a charge is not supplied to the internal power supply line of the semiconductor device concerned via an ESD protection diode from the control terminal receiving the control signal concerned.

<12> (A Buffer Circuit to Invert a Control Signal and a Memory Control Circuit of Active-Low Control)

In the semiconductor device according to Paragraph 11, the control unit includes a logic circuit (BR1-BR4) capable of generating a signal at an inverted logical level of the control signal inputted into the control terminal, and a memory control circuit (12) capable of performing the memory access when a signal generated by the logic circuit is at a low level, and capable of stopping the memory access when a signal generated by the logic circuit is at a high level.

According to this configuration, it is possible to realize an active-high memory IC without changing greatly the circuit configuration of the existing active-low memory IC.

<13> (Details of the Control Signal of the Memory IC)

In the semiconductor device according to one of Paragraph 11 and Paragraph 12, the control terminal includes a write enable terminal (P1) to input a signal (WE) to enable write of data to the nonvolatile RAM array and an output enable terminal (P2) to input a signal (OE) to enable read of data from the nonvolatile RAM array. The control terminal further includes a byte enable terminal (P3) to input a signal (BE) to enable a byte access, and a chip enable terminal (P4) to input a signal (CE) to enable selection of the semiconductor device concerned.

2. Further Detailed Description of the Embodiments

The embodiments are further explained in full detail. In the entire diagrams to explain the embodiments of the present invention, the same symbol is attached to an element which possesses the same function, and the repeated explanation thereof is omitted.

<<Embodiment 1>>

Figure 1:
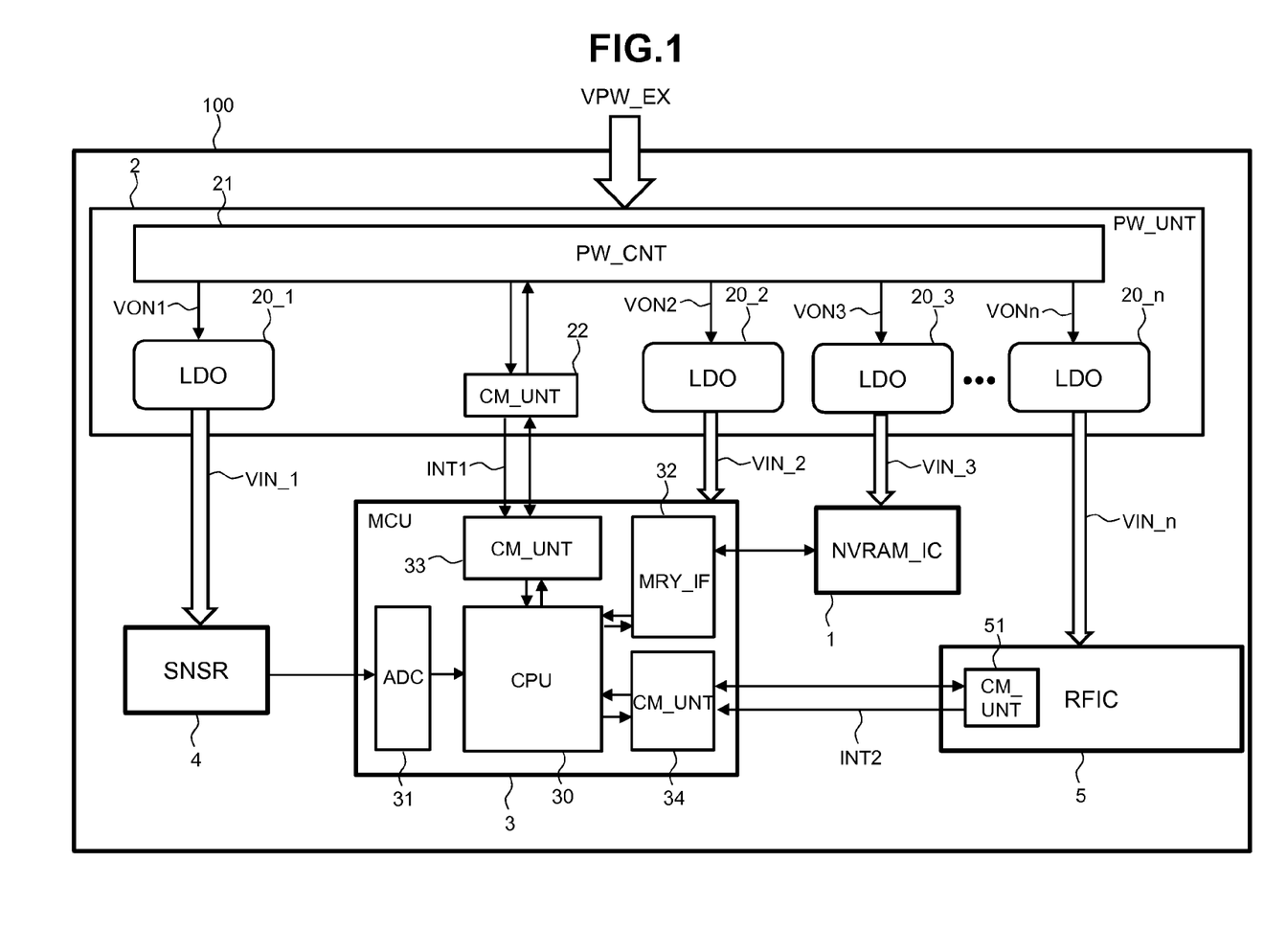
FIG. 1 is a drawing illustrating a configuration of a data processing system according to Embodiment 1.

FIG. 1 illustrates a configuration of a data processing system according to Embodiment 1.

A data processing system 100 illustrated in the figure configures one sensor system for example, and performs various kinds of operations based on information detected by a sensor or sensors; accordingly, the data processing system 100 generates various data and performs control of various kinds of devices. The data processing system 100 is a sensor system whose operation is enabled on the basis of an electric power supply by a battery or energy harvesting technology, for example. Devices (a sensor, a microcontroller, a radio frequency IC, etc.) which configure the system are arranged at various places in the system. Therefore, it is required that the system can operate at reduced electric power as much as possible, and at reduced costs for maintenance, such as replacement of a battery.

Specifically, the data processing system 100 is configured with an external memory (NVRAM_IC) 1, a power supply unit (PW_UNT) 2, a microcontroller (MCU) 3, a sensor unit (SNSR) 4, a radio frequency IC (RFIC) 5, and other peripheral circuits (not shown). FIG. 1 illustrates one sensor unit as an example; however, there is no restriction in particular of the number of the sensor units provided in the data processing system 100.

For example, the sensor unit 4 converts information inputted from the exterior into an electrical signal (analog signal), which is then amplified and outputted. Although not limited in particular, the sensor unit 4 includes a temperature sensor, a humidity sensor, etc.

The MCU 3 performs centralized control of the data processing system 100, and at the same time, performs various kinds of arithmetic processing on the basis of the detection signal supplied from the sensor unit 4 and outputs the arithmetic processing result externally, as various kinds of information data and control data to control devices. The MCU 3 is a semiconductor integrated circuit formed over a semiconductor substrate such as single crystal silicon by the well-known CMOS integrated circuit manufacturing technology, for example.

Specifically, the MCU 3 is configured with an A/D conversion unit (ADC) 31, an arithmetic processing unit (CPU) 30, a memory interface circuit (MRY_IF) 32, communication control units (CM_UNT) 33 and 34, and an internal bus and various interface circuits (the latter two are not shown).

The A/D conversion unit 31 converts a detection signal (analog signal) of the sensor unit 4 into digital data. The arithmetic processing unit 30 performs various kinds of arithmetic processing on the basis of the digital data converted by the A/D conversion unit 31. Specifically, the arithmetic processing unit 30 performs the arithmetic processing according to a program loaded to the external memory 1 from a ROM (not shown) in the MCU, and stores the arithmetic result in the external memory 1 if necessary. The memory interface circuit 32 is an interface circuit to control the memory access to the external memory 1 supplied from the arithmetic processing unit 30, a DMAC (not shown), etc., and functions as an external expansion bus. The details the memory interface circuit 32 will be described later. The communication control units 33 and 34 are the interface circuits to communicate with an external device. Although not limited in particular, the communication control units 33 and 34 generate a data stream in conformity with communication protocols, such as SPI (Serial Peripheral Interface), and perform a serial communication. For example, the communication control unit 33 controls the serial communication with the power supply unit 2, and the communication control unit 34 controls the serial communication with the radio frequency IC 5.

For example, the MCU 3 performs arithmetic processing on the basis of the detection result received from the sensor unit 4. The MCU 3 stores the arithmetic processing result in the external memory 1 as temperature data or humidity data and transmits the arithmetic processing result to a host system such as an external server, via the radio frequency IC 5.

The radio frequency IC 5 transmits, on radio via an antenna (not shown), the various data supplied from the MCU 3 by the serial communication, and supplies the data received via the antenna concerned to the MCU 3 by the serial communication. The radio frequency IC 5 includes a communication control unit 51, for example. As is the case with the communication control units 33 and 34 of the MCU 3, the communication control unit 51 generates a data stream in conformity with communication protocols, such as SPI, and realizes the serial communication with the MCU 3.

The external memory 1 is a semiconductor integrated circuit (memory IC) which includes a RAM array configured with plural memory cells capable of performing the read and write of data and which is accessible by the MCU 3. The memory cell is a nonvolatile RAM, such as an MRAM (Magnetoresistive Random Access Memory), an FRAM (Ferroelectric Random Access Memory), an ReRAM (Resistive Random Access Memory), etc. The concrete configuration of the external memory 1 will be described later.

The power supply unit 2 controls the power supply to each device separately. For example, the power supply unit 2 is realized by a power IC and plural electronic parts, such as a capacitor and an inductor, which are externally coupled to the power IC concerned. Here, the power IC is an integration of plural LDO (Low Drop Out) regulators, a switching regulator controller, etc. which are formed over a semiconductor substrate such as one piece of single crystal silicon, by the well-known CMOS integrated circuit manufacturing technology.

Specifically, the power supply unit 2 is configured with plural regulator circuits (LDO) 20_1-20_n (n is an integer greater than one), a power supply control unit (PW_CNT) 21, and a communication control unit (CM_UNT) 22. Here, the plural regulator circuits (LDO) 20_1-20_n generate a desired voltage from an external voltage VPW_EX supplied by a battery or energy harvesting technology.

The regulator circuits 20_1-20_n are power supply circuits, such as an LDO regulator and a switching regulator. The present embodiment will be explained assuming that the regulator circuits 20_1-20_n are LDO regulators. Each of the regulator circuits 20_1-20_n is provided corresponding to each of the devices (the MCU 3, the external memory 1, etc.), and controls the supply and cutoff of the power supply to the corresponding device.

The communication control unit 22 is an interface circuit to communicate with an external device. As is the case with the communication control units 33 and 34 of the MCU 3, the communication control unit 22 generates a data stream in conformity with communication protocols, such as SPI, and performs a serial communication with the MCU 3.

The power supply control unit 21 performs centralized control of the power supply unit 2. For example, the power supply control unit 21 controls the supply and cutoff of the power supply to each device, by controlling each regulator circuit 20_1-20_n in response to the instructions from the MCU 3 received via the communication control unit 22. For example, when the cutoff of the power supply to the external memory 1 is requested from the MCU 3, the regulator circuit 20_3 is controlled by means of a power supply control signal VON3, and the supply of the power supply voltage VIN_3 to the external memory 1 is stopped. When modification of the power supply voltage to the sensor unit 4 is requested from the MCU 3, the regulator circuit 20_1 is controlled by means of a power supply control signal VON1, and the voltage value of the power supply voltage VIN_1 supplied to sensor unit 4 is changed. Furthermore, when cutting off the power supply to the MCU 3, for example, the MCU 3 sets starting time to the built-in timer (not shown) of the power supply unit 2 via the communication control unit 22, then the power supply control unit 21 controls the regulator circuit 20_2 by means of a power supply control signal VON2; accordingly, the power supply of the MCU 3 is stopped.

Each of the MCU 3, the external memory 1, the sensor unit 4, and the radio frequency IC 5 has a normal operation mode and at least one standby mode, as the operation mode. For example, the external memory 1 has two operation modes: a non-standby mode (normal operation mode) NML_MODE in which the power is supplied, and a standby mode STB_MODE in which the power is cut off. Same applies to the sensor unit 4 and the radio frequency IC 5. The MCU 3 has a non-standby mode (normal operation mode) and plural standby modes. For example, the MCU 3 has a standby mode in which a clock frequency of the MCU 3 is set lower than in the normal operation mode, a standby mode in which the clock frequency and the power supply voltage of the MCU 3 are set lower than in the normal operation mode, a standby mode in which the power supply of the MCU 3 is cut off, etc. The MCU 3 determines the operation mode of each device, depending on the operating state of each device.

Figure 2:
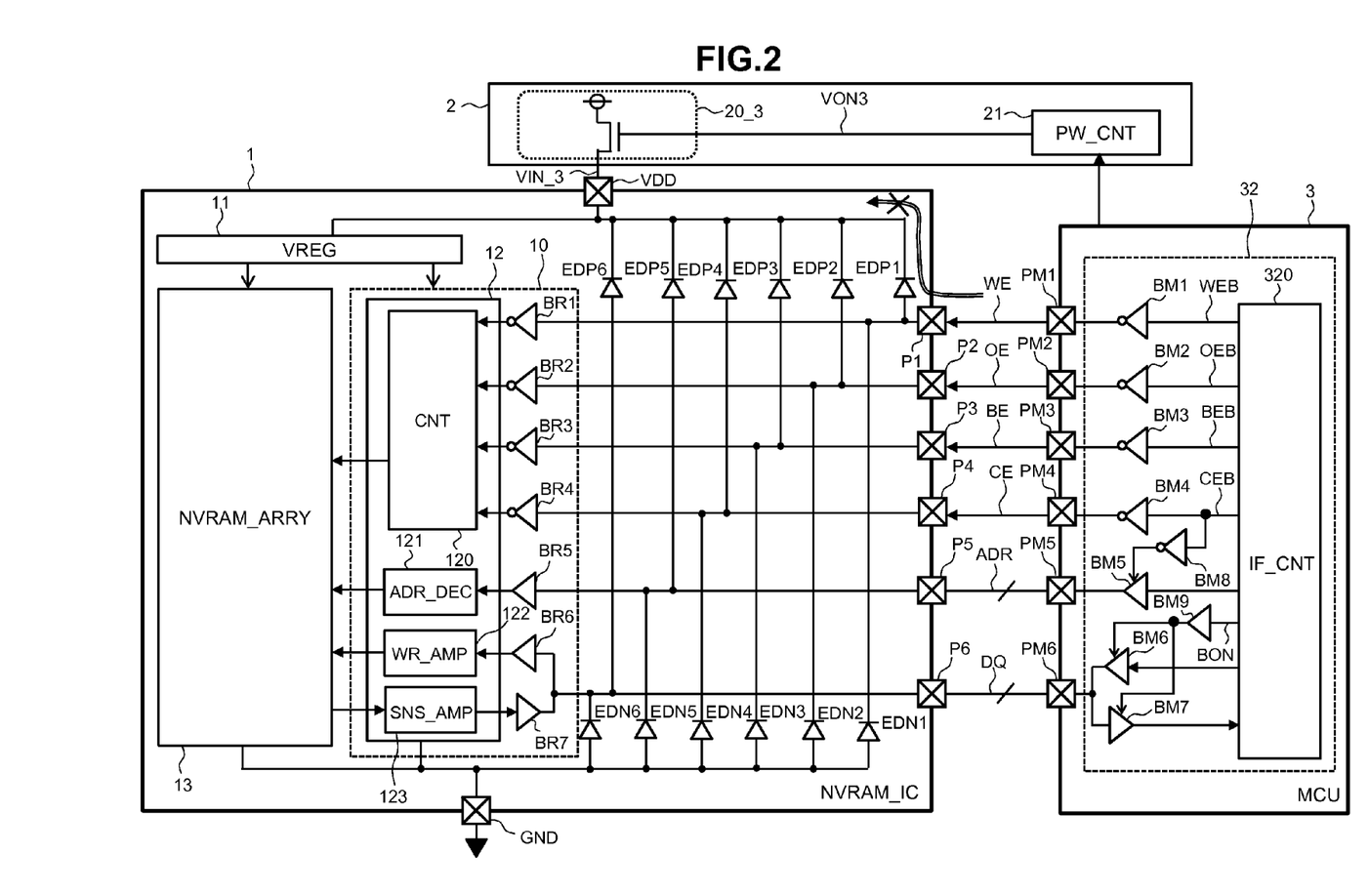
FIG. 2 is a drawing illustrating internal configurations of a memory interface circuit 32 of an MCU 3 and an external memory 1.

Next, the internal configuration of the external memory 1 is explained in detail.

FIG. 2 illustrates an internal configuration of the memory interface circuit 32 of the MCU 3 and an internal configuration of the external memory 1.

As illustrated in FIG. 2, the external memory 1 is configured with a RAM array (NVRAM_ARRY) 13 configured with plural nonvolatile memory cells, a memory interface circuit 10, an internal regulator circuit (VREG) 11, plural external terminals, and ESD protection diodes coupled to respective external terminals. FIG. 2 illustrates, as representatives of the plural external terminals, a power supply terminal VDD which receives the power supply voltage VIN_3 from the regulator circuit 20_3 of the power supply unit 2, a ground terminal GND coupled to a ground node, and external terminals P1-P6. FIG. 2 also illustrates ESD protection diodes EDP1-EDP6 and EDN1-EDN6, respectively coupled to the external terminals P1-P6, as representatives of the ESD protection diodes coupled to the plural external terminals. It is assumed that the reference symbol VDD expresses not only the power supply terminal but also a power supply line coupled to the power supply terminal.

The external memory 1 receives a signal for memory access via the external terminals P1-P6. The signal for the memory access includes, for example, a control signal to control the read and write of data, an address signal ADR to specify the address of the RAM array 13, and a data signal DQ indicative of write-in data or read-out data to the RAM array 13. The control signal includes, for example, a write enable signal WE to enable write of data to the RAM array 13, an output enable signal OE to enable read of data from the RAM array 13, a byte enable signal BE to enable a byte access, and a chip enable signal CE to enable the selection of the external memory 1.

The external terminals P1, P2, P3, and P4 input the write enable signal WE, the output enable signal OE, the byte enable signal BE, and the chip enable signal CE, respectively. The ESD protection diode EDP1 is coupled between the external terminal P1 and the power supply terminal VDD and the ESD protection diode EDN1 is coupled between the external terminal P1 and the ground terminal GND. For example, the ESD protection diode EDP1 is coupled to the external terminal P1 at the anode thereof and coupled to the power supply terminal VDD at the cathode thereof. The ESD protection diode EDN1 is coupled to the external terminal P2 at the cathode thereof and coupled to the ground terminal GND at the anode thereof. Similarly, the ESD protection diodes EDP2-EDP4 are coupled between the external terminals P2-P4 and the power supply terminal VDD respectively, and the ESD protection diodes EDN2-EDN4 are coupled between the external terminals P2-P4 and the ground terminal GND, respectively.

The external terminal P5 inputs the address signal ADR. The ESD protection diodes EDP5 and EDN5 are coupled to the external terminal P5, as is the case with the external terminal P1. FIG. 2 illustrates one external terminal P5. Practically, however, plural number of external terminals P5 are provided and the number is determined corresponding to the width of the address bus of the memory.

The external terminal P6 inputs the data signal DQ. The ESD protection diodes EDP6 and EDN6 are coupled to the external terminal P6, as is the case with the external terminal P1. FIG. 2 illustrates one external terminal P6. Practically, however, plural number of external terminals P6 are provided and the number is determined corresponding to the width of the data of the memory.

The internal regulator circuit 11 generates an internal power supply voltage from the power supply voltage VIN_3 supplied to the power supply terminal VDD. The generated internal power supply voltage is supplied as an operation power supply of the RAM array 13 and the memory interface circuit 10.

The memory interface circuit 10 performs the write of data or the read of data to the RAM array 13, on the basis of each of the control signals supplied to the external terminals P1-P4, and the address signal ADR supplied to the external terminal P5.

Specifically, the memory interface circuit 10 realizes the so-called active-high memory access. That is, according to the control signal such as the chip enable signal CE having been set at a high level (High), the read and write of data to the RAM array 13 are performed, and according to the control signal having been set at a low level (Low), the read and write of data to the RAM array 13 are forbidden. For example, according to the chip enable signal CE and the output enable signal OE having been set at a high level, the memory interface circuit 10 reads data from the memory cell in the RAM array 13 having the address specified by the address signal ADR, and outputs the read data to the external terminal P6. According to the chip enable signal CE and the write enable signal WE having been set at a high level, the memory interface circuit 10 writes the data signal DQ inputted to the external terminal P6, into the memory cell in the RAM array 13 having the address specified by the address signal ADR. Furthermore, when the byte enable signal BE is set at a high level in the write of data and in the read of data, the memory interface circuit 10 performs the memory access in units of bytes.

Specifically, the memory interface circuit 10 is configured with a memory control circuit 12 and plural buffer circuits BR1-BR7.

Among the buffer circuits BR1-BR7, the buffer circuits BR1-BR4 input the write enable signal WE, the output enable signal OE, the byte enable signal BE, and the chip enable signal CE, invert the logical level of the inputted signals, and output them. On the other hand, the buffer circuits BR5-BR7 input the address signal ADR and the data signal DQ, generate signals having the same logical level as the inputted signals, and output them.

The memory control circuit 12 realizes the so-called active-low memory access, as is the case with the SRAM interface, for example. That is, according to the inputted control signal having been set at a low level, the read or write of data to the RAM array 13 is performed, and according to the control signal having been set at a high level, the read and write of data to the RAM array 13 are forbidden. Specifically, the memory control circuit 12 is configured with a control circuit (CNT) 120, an address decoder (ADR_DEC) 121, a write amplifier (WR_AMP) 122, and a sense amplifier (SNS_AMP) 123. The address decoder 121 includes a row decoder and a column decoder. The address decoder 121 decodes the address signal ADR inputted via the buffer circuit BR5, and specifies a target memory cell of the write or read of data. The write amplifier 122 amplifies the write data signal supplied from the buffer circuit BR6, and supplies it to the memory cell. The sense amplifier 123 amplifies the read data signal obtained from the memory cell, and supplies it to the buffer circuit BR7. The control circuit 120 performs the read and write of data to the RAM array 13, according to the output signal of the buffer circuits BR1-BR4 having been set at a low level, and stops the read and write of data to the RAM array 13, according to the output signal of the buffer circuits BR1-BR4 having been set at a high level.

As described above, by configuring the memory interface circuit 10 such that the memory control circuit 12 which is capable of the active-low memory access is supplied with the inverted signals of the chip enable signal CE, etc., it is possible to realize an active-high memory IC without changing greatly the circuit configuration of the existing active-low SRAM interface circuit.

Next, the memory interface circuit 32 in the MCU 3 is explained.

The memory interface circuit 32 performs the write or read of data to the external memory 1 via the external terminals PM1-PM6 of the MCU 3, according to the memory access request from the arithmetic processing unit 30, DMAC, etc.

The external terminals PM1-PM6 of the MCU 3 are coupled to the corresponding external terminals P1-P6 of the external memory 1, respectively. The memory interface circuit 32 outputs the write enable signal WE to the external terminal PM1, the output enable signal OE to the external terminal PM2, the byte enable signal BE to the external terminal PM3, and the chip enable signal CE to the external terminal PM4. The memory interface circuit 32 also outputs the address signal ADR to the external terminal PM5. The memory interface circuit 32 outputs a write data signal to the external terminal PM6 when writing data in the external memory 1, and inputs a read data signal from the external terminal PM6 when reading data from the external memory 1.

The memory interface circuit 32 functions as an interface which realizes active-high control for performing the read and write of data to the active-high memory IC. Specifically, when the read and write of data to the RAM array 13 are performed, the memory interface circuit 32 sets the control signal such as the chip enable signal CE at a high level, outputs the address signal ADR to specify the address, and outputs the data signal DQ to be written or inputs the data signal DQ read. When the read and write of data to the RAM array 13 are stopped, on the other hand, the memory interface circuit 32 sets the control signal such as chip enable signal CE at a low level, sets the external terminal PM6 to output or to input the data signal DQ to a high impedance (Hi-z) state, and sets the address signal ADR at a low level or sets the external terminal PM5 to a high-impedance state.

Specifically, the memory interface circuit 32 is configured with a control circuit 320 and plural buffer circuits BM1-BM9.

The control circuit 320 outputs an address signal adr to specify an address of the RAM array 13, a data signal dq indicative of the write-in data or read-out data of the RAM array 13, and various kinds of control signals to control the read and write of data. The control signals include a write enable signal WEB to enable write of data, an output enable signal OEB to enable read of data, a byte enable signal BEB to enable a byte access, a chip enable signal CEB to enable the selection of the external memory 1, and a buffer enable signal BON to enable the input or output of a data signal.

The control circuit 320 sets the write enable signal WEB at a low level when enabling the write of data to the RAM array 13, and sets the write enable signal WEB at a high level when stopping the write of data to the RAM array 13. The control circuit 320 sets the output enable signal OEB at a low level, when enabling the read of data to the RAM array 13, and sets the output enable signal OEB at a high level, when stopping the read of data to the RAM array 13. When the memory access in units of bytes is to be instructed in the read and write of data to the RAM array 13, the control circuit 320 sets the byte enable signal BEB at a low level. When the memory access in units of bytes is not instructed, on the other hand, the control circuit 320 sets the byte enable signal BEB at a high level. Furthermore, the control circuit 320 sets the chip enable signal CEB at a low level, when performing memory access to the external memory 1, and sets the chip enable signal CEB at a high level, when not performing the memory access to the external memory 1. In this way, the control circuit 320 functions as an interface which realizes active-low control for performing the read and write of data to the active-low memory IC.

The buffer circuit BM1 inverts the logical level of the write enable signal WEB, and outputs it to the external terminal PM1 as the write enable signal WE. The buffer circuit BM2 inverts the logical level of the output enable signal OEB, and outputs it to the external terminal PM2 as the output enable signal OE. The buffer circuit BM3 inverts the logical level of the byte enable signal BEB, and outputs it to the external terminal PM3 as the byte enable signal BE. The buffer circuit BM4 inverts the logical level of the chip enable signal CEB, and outputs it to the external terminal PM4 as the chip enable signal CE. The buffer circuit BM8 inverts the logical level of the inputted chip enable signal CEB, and supplies it to the buffer circuit BM5. The buffer circuit BM5 controls to enable or to disenable the output of the address signal ADR on the basis of the chip enable signal CEB. Specifically, when the chip enable signal CEB is at a low level (when the output signal of the buffer circuit BM8 is at a high level), the buffer circuit BM5 outputs the inputted address signal adr to the external terminal PM5 as the address signal ADR. On the other hand, when the chip enable signal CEB is at a high level (when the output signal of the buffer circuit BM8 is at a low level), the buffer circuit BM5 stops outputting of the address signal ADR. In this case, the buffer circuit BM5 sets the output node coupled to the external terminal PM5 to a high-impedance state, or outputs the address signal ADR at a low level.

The buffer circuit BM9 supplies a signal having the same logical level as the buffer enable signal BON to the buffer circuits BM6 and BM7, respectively. The buffer circuit BM6 controls to enable or to disenable the output of the data signal dq on the basis of the buffer enable signal BON supplied via the buffer circuit BM9. Specifically, when the buffer enable signal BON is at a high level, the buffer circuit BM6 outputs the data signal dq without inverting the logical level thereof to the external terminal PM6, as the data signal DQ. On the other hand, when the buffer enable signal BON is at a low level, the buffer circuit BM6 stops the output of the data signal DQ. In this case, the buffer circuit BM6 sets the output node coupled to the external terminal PM6 to a high-impedance state, for example.

The buffer circuit BM7 controls to enable or to disenable an input of the data signal DQ inputted into the external terminal PM6, on the basis of the buffer enable signal BON supplied from the buffer circuit BM9. Specifically, when the buffer enable signal BON is at a high level, the buffer circuit BM7 inputs the data signal DQ, and outputs it to the control circuit 320 without inverting the logical level thereof. On the other hand, when the buffer enable signal BON is at a low level, the buffer circuit BM7 stops the input of the data signal DQ. In this case, the buffer circuit BM7 sets the input node coupled to the external terminal PM6 to a high-impedance state, for example.

As described above, by configuring the memory interface circuit 32 so as to invert the control signal from the control circuit 320 under the active-low control by means of the buffer circuits BM1-BM4 and to generate the chip enable signal CE, etc., it is possible to realize an active-high memory IC interface without changing greatly the circuit configuration of the existing SRAM interface circuit.

Next, the operation timing of the data processing system 100 at the time of the read and write of data to the external memory 1 is explained with reference to FIG. 3 and FIG. 4.

Figure 3:
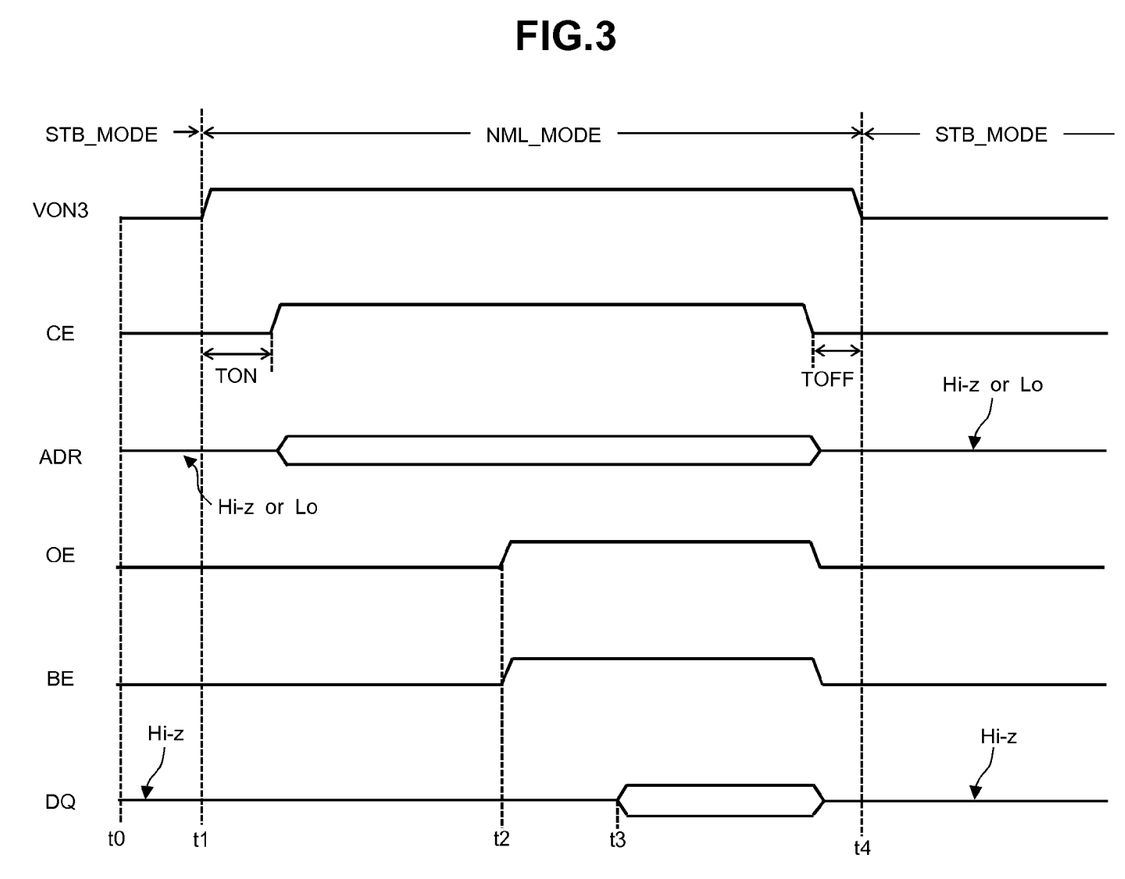
FIG. 3 is a timing chart at the time of data read from the external memory 1.

FIG. 3 is a timing chart at the time of data read from the external memory 1.

FIG. 3 illustrates, as an example, the case where the external memory 1 is in a standby state, in the initial state at time t0. When the external memory 1 is set to the standby mode STB_MODE, the power supply control signal VON3 supplied to the regulator circuit 20_3 of the power supply unit 2 is set at a low level, and the supply of the power supply voltage VIN_3 to the external memory 1 is stopped. At this time, the memory interface circuit 32 of the MCU 3 sets the chip enable signal CE, the output enable signal OE, and the byte enable signal BE, at a low level, sets the address signal ADR at a low level or the external terminal PM5 to a high-impedance state, and sets the external terminal PM6 to output the data signal DQ to a high impedance (Hi-z) state. Accordingly, in the external memory 1 of which the power supply has been cut off, it is possible to prevent a charge from being supplied to the power supply line VDD of the external memory 1 from the external terminals P1-P6 via the ESD protection diodes EDP1-EDP6.

At time t1, when the power supply control signal VON3 is set at a high level, and the supply of the power supply voltage VIN_3 to the external memory 1 is started, the external memory 1 shifts to the normal operation mode NML_MODE. Subsequently, when a predetermined time TON elapses and the internal electronic circuit of the external memory 1 is enabled to operate, the memory interface circuit 32 performs the read of data to the external memory 1. First, the memory interface circuit 32 sets the chip enable signal CE at a high level and outputs the address signal ADR. At the subsequent time t2, the memory interface circuit 32 sets the output enable signal OE and the byte enable signal BE at a high level. Accordingly, at the subsequent time t3, the data signal DQ read from the external memory 1 is inputted to the memory interface circuit 32, and the read of data is completed. Subsequently, the memory interface circuit 32 sets the chip enable signal CE, the output enable signal OE, and the byte enable signal BE at a low level, sets the address signal ADR at a low level or sets the external terminal PM5 to a high-impedance state (Hi-z), and sets the external terminal PM6 to output data signal DQ to a high-impedance state. Then, at time t4 when a series of processing related to the read of data has completed after a predetermined time TOFF elapses after the chip enable signal CE, etc. is set at a low level, the MCU 3 instructs the power supply unit 2 to shift the external memory 1 to the standby mode STB_MODE. In response to the instruction, the power supply unit 2 sets the power supply control signal VON3 at a low level to stop the supply of the power supply voltage VIN_3 to the external memory 1. Accordingly, the external memory 1 becomes in a standby state again.

Figure 4:
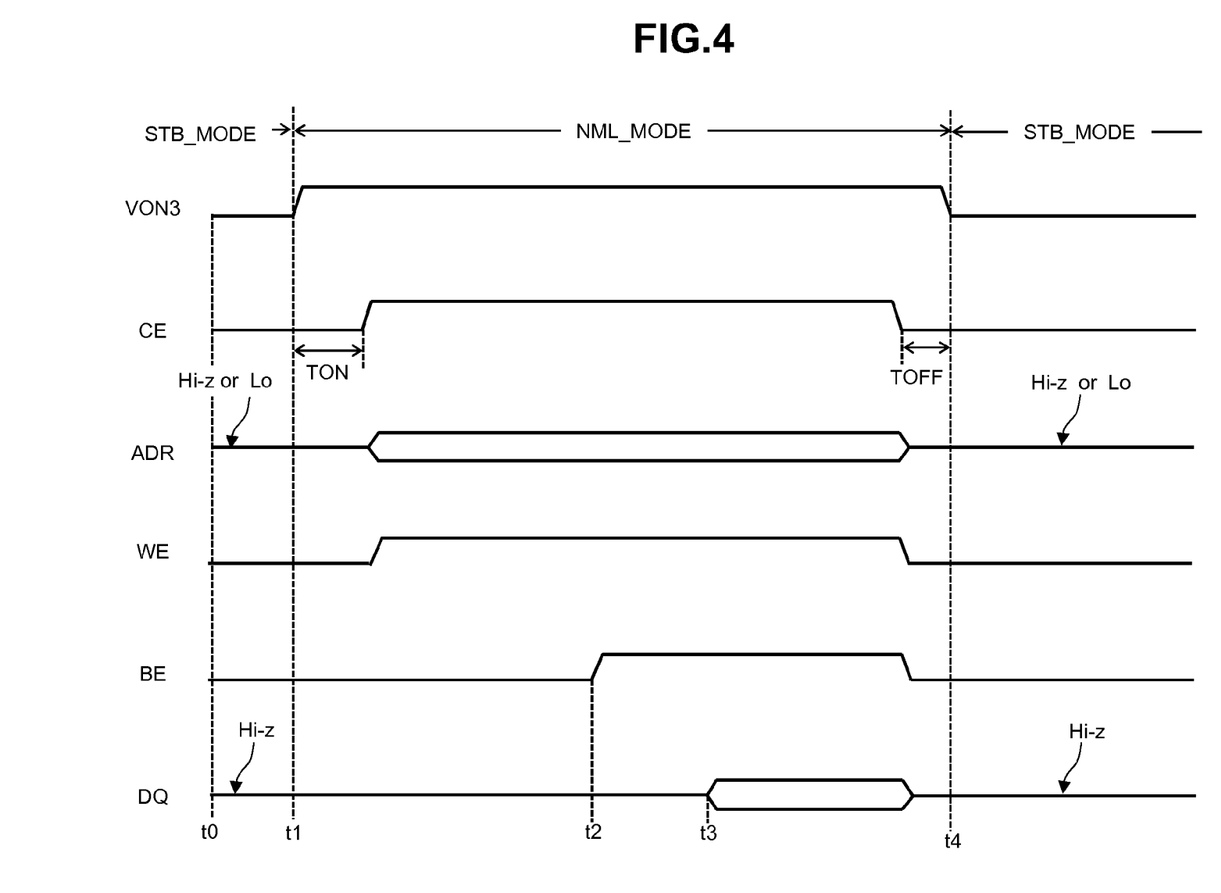
FIG. 4 is a timing chart at the time of data writing to the external memory 1.

FIG. 4 is a timing chart at the time of data writing to the external memory 1.

FIG. 4 illustrates, as an example, the case where the external memory 1 is in a standby state, in the initial state at time t0. When the external memory 1 is set to the standby mode STB_MODE, the memory interface circuit 32 sets the chip enable signal CE, the output enable signal OE, and the byte enable signal BE at a low level, sets the address signal ADR at a low level or the external terminal PM5 to a high-impedance (Hi-z) state, and sets the external terminal PM6 to a high-impedance state. Accordingly, in the external memory 1 of which the power supply has been cut off, it is possible to prevent a charge from being supplied to the power supply line VDD of the external memory 1 via the external terminals P1-P6.

At time t1, when the power supply control signal VON3 is set at a high level, and the supply of the power supply voltage VIN_3 to the external memory 1 is started, the external memory 1 shifts to the normal operation mode NML_MODE. Subsequently, when a predetermined time TON elapses and the internal electronic circuit of the external memory 1 is enabled to operate, the memory interface circuit 32 performs the write of data to the external memory 1. First, the memory interface circuit 32 sets the chip enable signal CE at a high level, outputs the address signal ADR, and sets the write enable signal WE at a high level. Subsequently at time t2, the memory interface circuit 32 sets the byte enable signal BE at a high level. Then, at time t3, the memory interface circuit 32 outputs the data stream to be written as the data signal DQ to the external terminal PM6. Accordingly, the write of data to the external memory 1 is realized. When the write of data is completed, the memory interface circuit 32 sets again the chip enable signal CE, the output enable signal OE, and the byte enable signal BE at a low level, sets the address signal ADR at a low level or the external terminal PM5 to a high-impedance (Hi-z) state, and sets the external terminal PM6 to a high-impedance state. Then, at time t4 when a series of processing related to the write of data has completed after a predetermined time TOFF elapses after the control signal such as the chip enable signal CE is set at a low level, the MCU 3 instructs the power supply unit 2 to shift the external memory 1 to the standby mode STB_MODE. In response to the instruction, the power supply unit 2 sets the power supply control signal VON3 at a low level to stop the supply of the power supply voltage VIN_3 to the external memory 1. Accordingly, the external memory 1 returns to a standby state again.

In this way, by adopting the active-high control system to the external memory 1, when the external memory 1 is in a standby state and the power supply is cut off, the various signals supplied from the MCU 3 to the external memory 1 are set at a low level or in a high-impedance state. Therefore, it is possible to prevent electric current from flowing into the power supply line VDD of the external memory 1 via the external terminals P1-P6 coupled to the MCU 3. Accordingly, it is possible to reduce the power consumption of the entire data processing system when the external memory 1 is set in a standby state. In particular, by adopting the external memory 1 according to the present embodiment, it is possible to improve the power saving effect of the entire system furthermore, compared with the case where the nonvolatile RAM with interface specifications compatible with the existing SRAM interface is adopted. Since the external memory 1 operates not under the active-low control but under the active-high control, it is not necessary to perform complicated control to prevent the occurrence of an access to the RAM array 13 just before cutting off the power supply to the external memory 1. In contrast to Patent Literature 1 described above, it is not necessary to notify the external memory 1 of the power-on control signal indicative of the power cutoff, and it is also not necessary to provide an additional external terminal to input the signal concerned in the external memory 1.

The following explains communication between the MCU 3 and devices (the radio frequency IC 5, the power supply unit 2) except the external memory 1.

As described above, transmission and reception of data are possible between the MCU 3 and the power supply unit 2 and between the MCU 3 and the radio frequency IC 5.

Specifically, the communication between the MCU 3 and the power supply unit 2 is realized by transmission and reception of data by means of the serial communication via respective communication control units 33 and 22, and by an interrupt request from the power supply unit 2 to the MCU 3.

When the specification of the serial communication between the MCU 3 and the power supply unit 2 is SPI, the communication control units 33 and 22 are provided respectively with a total of four interfaces: interfaces to output and to input a clock signal CLK and a chip enable signal CE_S as the control signals; an output interface to output transmitting data DOUT; and an input interface to input receive data DIN. The interface described here includes an external terminal to input or to output a signal and a peripheral circuit such as a buffer which controls the input or output of data to the external terminal concerned. Similarly, the communication between the MCU 3 and the radio frequency IC 5 is realized by transmission and reception of data by means of a serial communication via the communication control units 34 and 51, and an interrupt request from the radio frequency IC 5 to the MCU 3. The communication control units 34 and 51 are provided respectively with the four interfaces described above, as is the case with the communication control units 33 and 22.

The serial communication between the MCU 3 and the power supply unit 2 and between the MCU 3 and the radio frequency IC 5, using the interfaces described above is performed under the active-high control, as is the case with the memory access to the external memory 1. Hereinafter, the details are explained with reference to FIG. 5 and FIG. 6.

Figure 5:
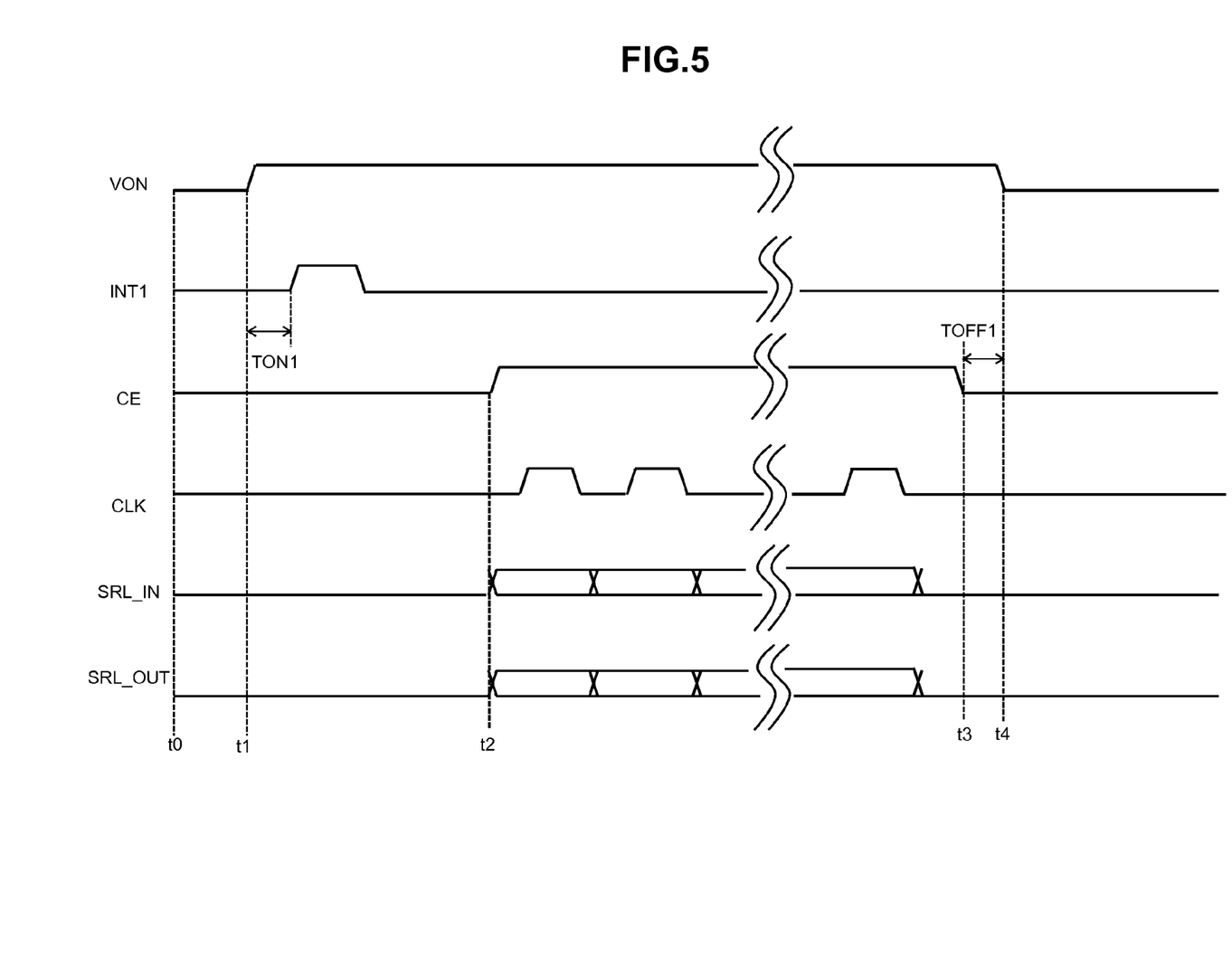
FIG. 5 is a timing chart of a serial communication between a power supply unit 2 and the MCU 3.

FIG. 5 is a timing chart of a serial communication between the power supply unit 2 and the MCU 3.

FIG. 5 illustrates, as an example, the case where the MCU 3 is in a standby state where the power is cut off, in the initial state at time t0. At time t0, the power supply control signal VON2 supplied to the regulator circuit 20_2 of the power supply unit 2 is set at a low level, and the supply of the power supply voltage VIN_2 to the MCU 3 is stopped. At this time, the communication control unit 22 in the power supply unit 2 sets the chip enable signal CE_S and the clock signal CLK at a low level, and sets the transmitting data DOUT and the receive data DIN at a low level. According to this configuration, as is the case with the power cutoff in the external memory 1 described above, in the MCU 3 of which the power supply is cut off, it is possible to prevent a charge from being supplied to the power supply line in the MCU 3 via an ESD protection diode from the communication control unit 33 (external terminal) as the interface for the serial communication. At this time, a signal may be inputted to the MCU 3 from the sensor unit 4, however, the input from the sensor unit 4 is an analog signal input; therefore, even if a charge is supplied, the influence is restrictive, not causing a large issue.

At time t1, when the power supply control signal VON3 is set at a high level, and the supply of the power supply voltage VIN_2 to the MCU 3 is started, the MCU 3 shifts to the normal operation mode. Subsequently, when a predetermined time TON1 elapses and the internal electronic circuit of the MCU 3 is enabled to operate, the power supply unit 2 outputs an interrupt signal INT1 to the MCU 3 via the communication control unit 22, and notifies that the serial communication is started. At subsequent timing t2, the communication control unit 22 sets the chip enable signal CE_S at a high level and outputs the clock signal CLK. Then, the power supply unit 2 and the MCU 3 perform the serial communication, exchanging the transmitting data DOUT and the receive data DIN, via the output/input interfaces of the communication control units 22 and 33. Subsequently, when the transmission and reception of data is completed, at time t3, the communication control unit 22 of the power supply unit 2 fixes the clock signal CLK at a low level, sets the transmitting data DOUT and the receive data DIN at a low level, and sets the chip enable signal CE_S at a low level. Then, at time t4 when a series of processing related to the write of data has completed after a predetermined time TOFF1 elapses after the control signal such as the chip enable signal CE_S is set at a low level, the power supply unit 2 sets the power supply control signal VON3 at a low level to stop the supply of the power supply voltage VIN_2 to the MCU 3. Accordingly, the MCU 3 shifts to a standby state again.

Figure 6:
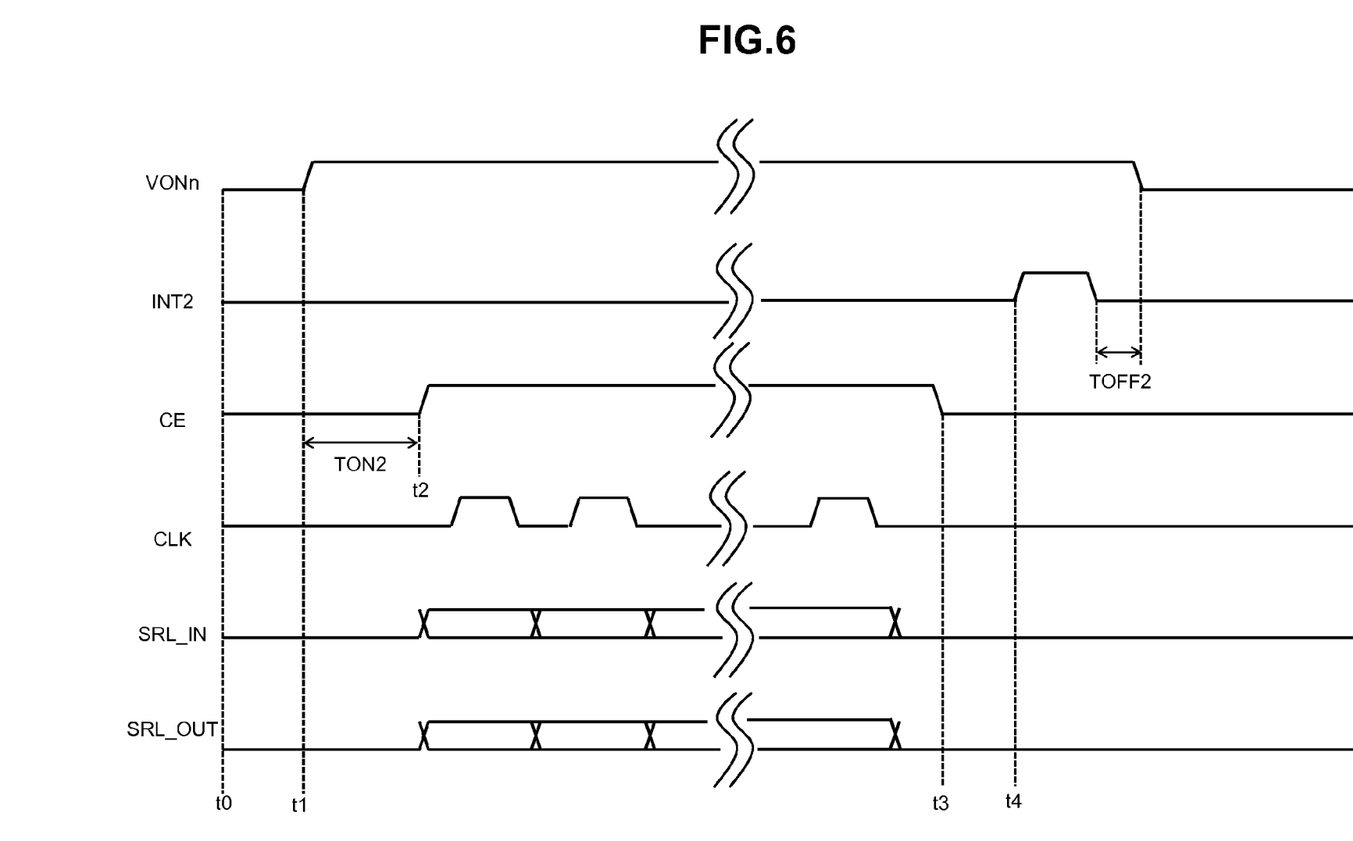
FIG. 6 is a timing chart of a serial communication between the MCU 3 and a radio frequency IC 5.

FIG. 6 is a timing chart of a serial communication between the MCU 3 and the radio frequency IC 5.

FIG. 6 illustrates, as an example, the case where the radio frequency IC 5 is in a standby state where the power is cut off, in the initial state at time t0. At time t0, the power supply control signal VONn supplied to the regulator circuit 20_n of the power supply unit 2 is set at a low level, and the supply of the power supply voltage VIN_n to the radio frequency IC 5 is stopped. At this time, the communication control unit 34 in the MCU 3 sets the chip enable signal CE_S and the clock signal CLK at a low level, and sets transmitting data DOUT and receive data DIN at a low level. According to this configuration, as is the case with the power cutoff in the external memory 1 described above, in the radio frequency IC 5 of which the power supply is cut off, it is possible to prevent a charge from being supplied to the power supply line in the radio frequency IC 5 via an ESD protection diode from the communication control unit 51 (external terminal) as the interface for the serial communication.

At time t1, when the power supply control signal VONn is set at a high level and the supply of the power supply voltage VIN_n to the radio frequency IC 5 is started, the radio frequency IC 5 shifts to a normal operation mode. Subsequently, at time t2 when a predetermined time TON2 elapses and the internal electronic circuit of the radio frequency IC 5 is enabled to operate, the communication control unit 34 of the MCU 3 sets the chip enable signal CE_S at a high level and outputs the clock signal CLK. Then, the MCU 3 and the radio frequency IC 5 perform the serial communication, exchanging the transmitting data DOUT and the receive data DIN, via the output/input interfaces of the communication control units 34 and 51. When the transmission and reception of data is completed, at time t3, the communication control unit 34 of the MCU 3 fixes the clock signal CLK at a low level, sets the transmitting data DOUT and the receive data DIN at a low level, and sets the chip enable signal CE_S at a low level. At time t4 when a series of processing related to the serial communication has completed, the radio frequency IC 5 outputs an interrupt signal INT2 to the MCU 3. In response to the received interrupt signal INT2, the MCU 3 instructs the power supply unit 2 to shift the radio frequency IC 5 to a standby mode after passage of a predetermined time TOFF2. When instructed, the power supply unit 2 sets the power supply control signal VONn at a low level to stop the supply of the power supply voltage VIN_n to the radio frequency IC 5. Accordingly, the radio frequency IC 5 shifts to a standby state again.

In this way, by exerting the active-high control over the serial communication between the devices in the data processing system, the various signals, which are related to the serial communication and supplied to the devices in the standby state where the power supply is cut off, are set at a low level. Therefore, it is possible to prevent electric current from flowing to the internal power supply line of the device in a standby state, via the interface (external terminal) for the serial communication. Accordingly, it is possible to reduce the power consumption of the entire data processing system when the device provided with the interface for the serial communication is set in a standby state. In particular, by adopting the interface for the serial communication according to the present embodiment (communication control units 33, 34, 22, and 51), it is possible to further improve the power saving effect of the entire system, compared with the case where an interface for the serial communication placed under the active-low control is adopted.

As described above, according to the data processing system according to Embodiment 1, it is possible to further reduce the power consumption of the entire data processing system when the power supply to each of the devices configuring the data processing system is cut off.

<<Embodiment 2>>

In addition to the function of the data processing system according to Embodiment 1, a data processing system according to Embodiment 2 has the function to switch the specification of the memory interface of the MCU between the active-high control and the active-low control.

The data processing system according to Embodiment 2 is the same as the data processing system 100 according to Embodiment 1 with respect to the hardware configuration of the external memory 1, the power supply unit 2, the sensor unit 4, and the radio frequency IC 5, but different with respect to the configuration of the memory interface circuit in the MCU.

Figure 7:
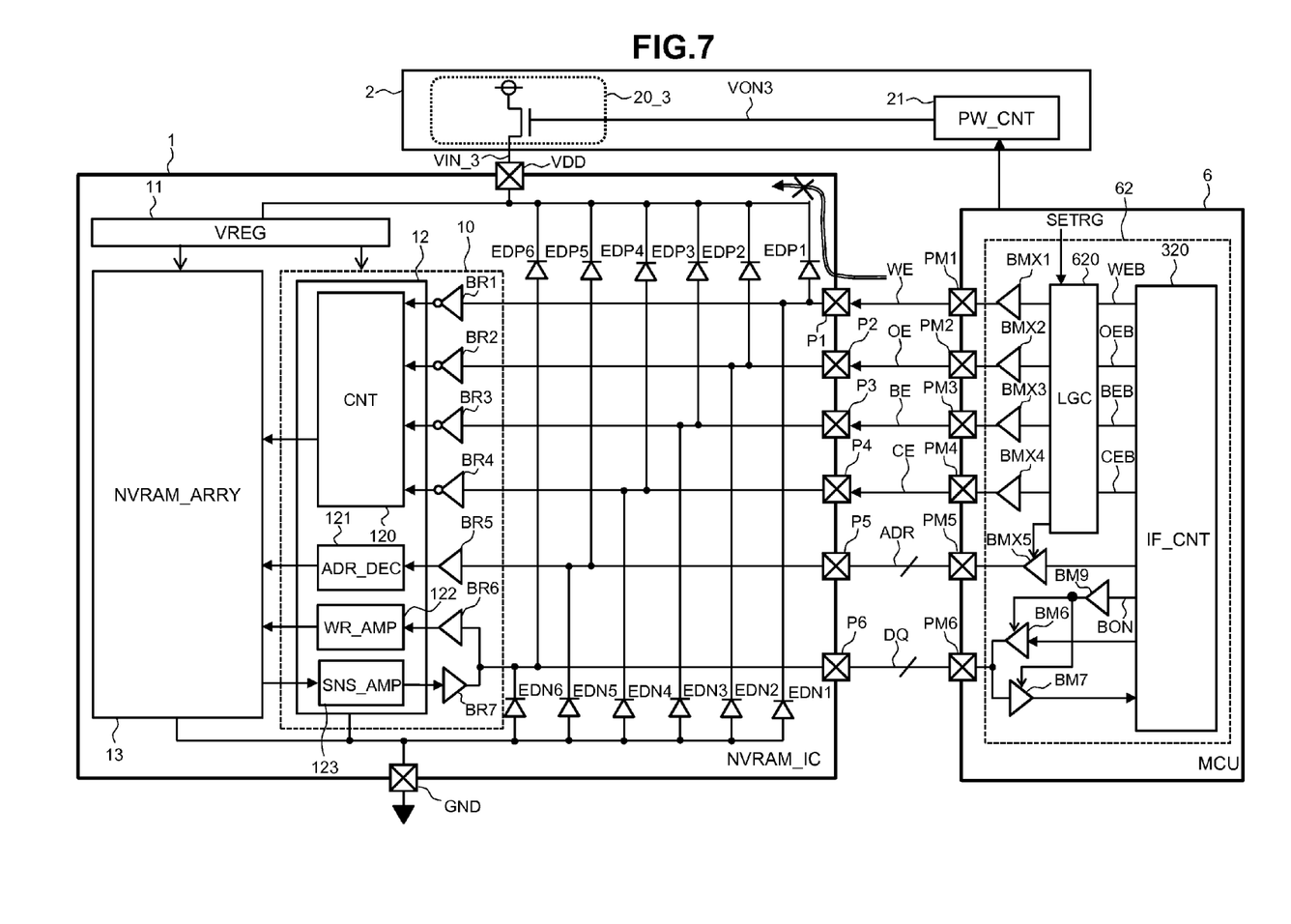
FIG. 7 is a drawing illustrating an internal configuration of an MCU 6 according to Embodiment 2.

FIG. 7 illustrates an internal configuration of an MCU 6 according to Embodiment 2.

As is the case with the memory interface circuit 32 according to Embodiment 1, the memory interface circuit 62 in the MCU 6 performs the write or read of data to the external memory 1 via the external terminals PM1-PM6 of the MCU 6, according to a memory access request from the arithmetic processing unit 30, DMAC, etc. For example, the memory interface circuit 62 outputs the write enable signal WE to the external terminal PM1, the output enable signal OE to the external terminal PM2, the byte enable signal BE to the external terminal PM3, and the chip enable signal CE to the external terminal PM4. The memory interface circuit 62 also outputs the address signal ADR to the external terminal PM5. The memory interface circuit 62 outputs a write data signal to the external terminal PM6 when writing data in the external memory 1, and inputs a read data signal from the external terminal PM6 when reading data from the external memory 1.

The memory interface circuit 62 switches the active-high control and the active-low control on the basis of a register setup SETRG in accessing the external memory 1.

Figure 8:
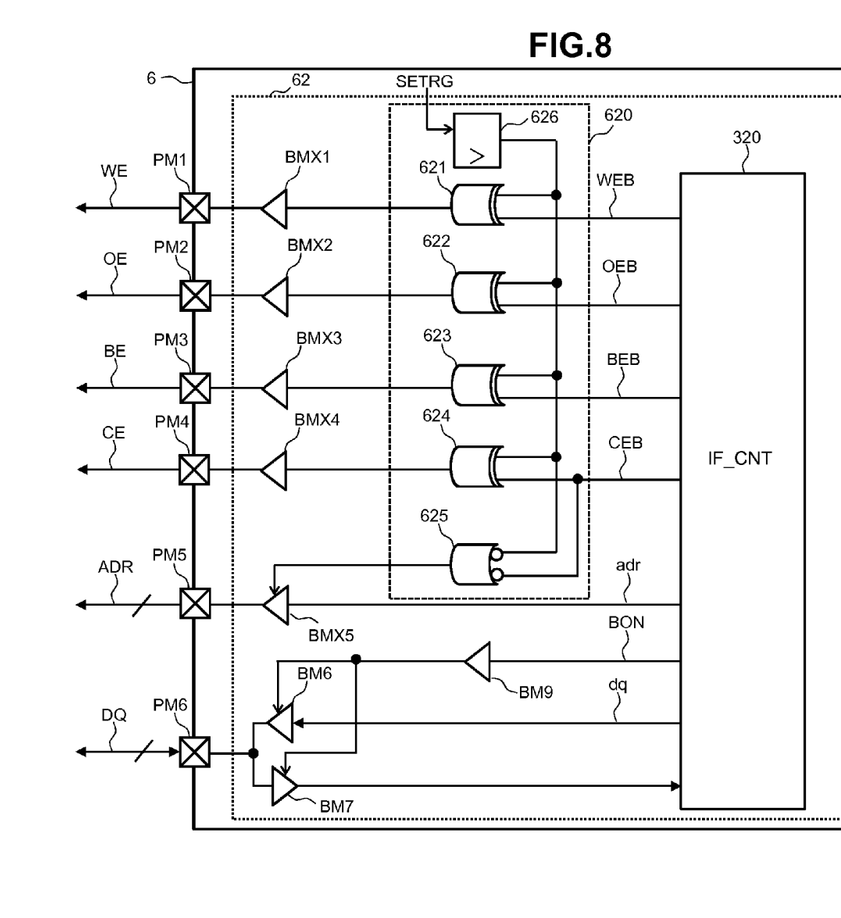
FIG. 8 is a drawing illustrating a concrete internal configuration of a memory interface circuit 62.

FIG. 8 illustrates a concrete internal configuration of the memory interface circuit 62. As illustrated in FIG. 8, the memory interface circuit 62 is provided with buffer circuits BMX1-BMX5 and a logic circuit 620, in lieu of the buffer circuits BM1-BM5 and BM8 in the memory interface circuit 32 according to Embodiment 1. In FIG. 8, the same symbol is attached to the same component as illustrated in FIG. 2, and the detailed explanation thereof is omitted.

The buffer circuits BMX1-BMX4 output a signal of the same logic as an input signal.

A logic circuit 620 is configured with EXOR circuits 621-624, an OR circuit 625, and a register 626. The register 626 is configured with an FF (Flip Flop) circuit, for example. The register 626 outputs a signal at a high level when "1" is set up as a register set value SETRG, and outputs a signal at a low level when "0" is set up as the register set value SETRG. The EXOR circuit 621 inputs the write enable signal WEB and an output signal of the register 626, performs an exclusive OR operation, and outputs the result to the buffer circuit BMX1. For example, when the register set value SETRG of the register 626 is "0", a signal of the same logic as the write enable signal WEB is outputted. On the other hand, when the register set value SETRG of the register 626 is "1", a signal of the opposite logic to the write enable signal WEB is outputted. The EXOR circuit 622 inputs the output enable signal OEB and the output signal of the register 626, performs an exclusive OR operation, and outputs the result to the buffer circuit BMX2. The EXOR circuit 623 inputs the byte enable signal BEB and the output signal of the register 626, performs an exclusive OR operation, and outputs the result to the buffer circuit BMX3. The EXOR circuit 624 inputs the chip enable signal CEB and the output signal of the register 626, performs an exclusive OR operation, and outputs the result to the buffer circuit BMX4. As is the case with the EXOR circuit 621, the EXOR circuits 622-624 output signals of the same logic as that of the inputted signals OEB, BEB, and CEB when the register set value SETRG is "0", and output signals of opposite logic to that of the inputted signals OEB, BEB, and CEB when the register set value SETRG is "1." The signals outputted from the EXOR circuits 621-624 are outputted from the corresponding external terminals PM1-PM4 as the write enable signal WE, the output enable signal OE, the byte enable signal BE, and the chip enable signal CE, via the buffer circuits BMX1-BMX4, respectively.

The OR circuit 625 inputs a signal obtained by inverting the output signal of the register 626 and a signal obtained by inverting the chip enable signal CEB, performs an OR operation, and supplies the result to the buffer circuit BMX5. For example, when the register set value SETRG is "0", the OR circuit 625 outputs always a signal at a high level, irrespective of the chip enable signal CEB. On the other hand, when the register set value SETRG is "1", the OR circuit 625 outputs a signal of an opposite logic of the chip enable signal CEB. The buffer circuit BMX5 controls whether to output or not to the external terminal PM5 the address signal adr supplied from the control unit 320, on the basis of the output signal of the OR circuit 625. For example, when the output signal of the OR circuit 625 is at a high level, the buffer circuit BMX5 outputs the address signal adr to the external terminal PM5, as the address signal ADR. On the other hand, when the output signal of the OR circuit 625 is at a low level, the buffer circuit BMX5 outputs the address signal ADR at a low level to the external terminal PM5, or sets an output node coupled to the external terminal PM5 to a high-impedance state.

According to the above-described configuration, it is possible to make the memory interface circuit 62 function as an interface of active-low control or as an interface of active-high control, depending on the register set value SETRG.

As described above, according to the MCU 6 according to Embodiment 2, it is possible to support both the active-high external memory and the active-low external memory, without providing separately a memory interface for active-high control, and a memory interface for active-low control.

As described above, the invention accomplished by the present inventors has been concretely explained based on the embodiments. However, it cannot be overemphasized that the present invention is not restricted to the embodiments, and it can be changed variously in the range which does not deviate from the gist.

For example, in the exemplified configuration, in the state where the power supply to a prescribed device in the data processing system 100 is cut off, the transmitting data DOUT to be outputted and the receive data DIN to be inputted via the interface for the serial communications of the device concerned are set at a low level. However, instead of setting the data at a low level, it is also preferable to set the external terminal, which outputs the transmitting data DOUT and inputs the receive data DIN, to a high-impedance state.

The chip enable signal CE, the byte enable signal BE, the write enable signal WE, and the output enable signal OE have been exemplified as the control signal to be supplied to the external memory 1. However, the control signal is not restricted to the signals described above, as long as the signal is for controlling the memory access. If the signal for controlling the memory access is defined as active high, it is possible to prevent electric current from flowing in at the time when the power supply to the external memory 1 is cut off, as is the case described above.

The case where the data processing system 100 is applied as a sensor system has been illustrated. However, not restricted to this, it is possible to apply the data processing system 100 to other systems, such as a battery-operated mobile terminal, etc.

The case where the regulator circuits 20_1-20_n in the power supply unit 2 are the LDO has been illustrated. However, the power supply circuit is not restricted to the LDO but it may be other power supply circuits, such as a switching regulator and a charge pump power supply, if the configuration is capable of changing the voltage value to be supplied to the hardware resources, and capable of controlling cutoff of the power supply voltage to the hardware resources.

In the configuration illustrated above, the power supply voltage of the RAM array 13 and the memory interface circuit 10 in the external memory 1 is supplied from the internal regulator circuit 11. However, it is also preferable to adopt the configuration in which the voltage VIN_3 supplied to the power supply terminal VDD of the external memory 1 is supplied directly to the RAM array 13 and the memory interface circuit 10.

What is claimed is:

1. A data processing system comprising:
  a microcontroller;
  a memory IC which includes a nonvolatile RAM array configured to perform read and write of data and to retain the data even in a standby state in which a power supply to the nonvolatile RAM array is cut off, and which is accessible by the microcontroller; and
  a power supply unit operable to control the power supply to the microcontroller and the memory IC, separately,
  wherein when a control signal to control the read and write of data to the nonvolatile RAM array is at a high level, the memory IC is enabled to perform the read and write of data to the nonvolatile RAM array, and when the control signal is at a low level, the memory IC is disenabled to perform the read and write of data to the nonvolatile RAM array, and
  wherein the microcontroller sets the control signal at a low level, when the memory IC is shifted to the standby state by the power supply unit.

2. The data processing system according to claim 1,
  wherein the microcontroller comprises an address output terminal, and
  wherein the microcontroller supplies an address signal to the memory IC via the address output terminal, when performing the read and write of data to the nonvolatile RAM array, and sets the address output terminal to a high-impedance state, when the memory IC is shifted to a standby state by the power supply unit.

3. The data processing system according to claim 1,
  wherein the microcontroller sets at a low level an address signal to be supplied to the memory IC, when the memory IC is shifted to a standby state by the power supply unit.

4. The data processing system according to claim 1,
  wherein the microcontroller and the power supply unit comprise respectively an interface unit operable to communicate with the exterior with the use of a communication control signal and a data signal,
  wherein each interface unit is enabled to perform transmission and reception of the data signal when the communication control signal is set at a high level at a prescribed timing, and each interface unit is disenabled to perform transmission and reception of the data signal when the communication control signal is set at a low level, and
  wherein, when the microcontroller is shifted to a standby state, the power supply unit sets at a low level the communication control signal to be supplied to the interface unit of the microcontroller, and sets at a low level the data signal to be supplied to the interface unit of the microcontroller.

5. The data processing system according to claim 4 further comprising:
  a device including the interface unit and operable to perform communication with the microcontroller via the interface unit,
  wherein the power supply unit is operable to control power supply to the device, and
  wherein, when the device is shifted to a standby state, the power supply unit sets at a low level the communication control signal to be supplied to the interface unit of the device, and sets at a low level the data signal to be supplied to the interface unit of the device.

6. The data processing system according to claim 1, wherein the control signal includes:
a write enable signal to enable write of data to the nonvolatile RAM array;
an output enable signal to enable read of data from the nonvolatile RAM array;
a byte enable signal to enable a byte access; and
a chip enable signal to enable selection of the memory IC.

7. A microcontroller comprising:
a plurality of control terminals to output a plurality of control signals to control read and write of data to an external memory;
a data terminal to input or to output data;
an address terminal to output an address signal to specify an address of the external memory; and
a memory interface circuit to access the external memory via the control terminals, the data terminal, and the address terminal,
wherein the memory interface circuit outputs the control signals at a high level when the read and write of data is performed to the external memory, and outputs the control signals at a low level when the read and write of data is stopped to the external memory, and
wherein the memory interface circuit outputs the control signals at a low level when the external memory is shifted to a standby state.

8. The microcontroller according to claim 7, wherein the memory interface circuit outputs the address signal at a low level from the address terminal, when the external memory is shifted to a standby state.

9. The microcontroller according to claim 7, wherein the memory interface circuit sets the address terminal to a high-impedance state, when the external memory is shifted to a standby state.

10. The microcontroller according to claim 7, wherein the memory interface circuit comprises:
a control circuit operable to output the control signals at a low level when performing the read and write of data to the external memory, and operable to output the control signals at a high level when stopping the read and write of data to the external memory; and
a logic circuit provided with a first register,
wherein the logic circuit supplies to the control terminal a signal of a logical level opposite to the control signal outputted from the control circuit, when a first value is set at the first register, and supplies to the control terminal a signal of a logical level same as the control signal outputted from the control circuit, when a second value different from the first value is set at the first register, and
wherein the memory interface circuit outputs the control signals at a high level when the external memory is shifted to a standby state.

11. A semiconductor device comprising:
a nonvolatile RAM array configured to perform write or read of data and to retain the data even in a standby state in which a power supply to the nonvolatile RAM array is cut off;
a plurality of control terminals to input a plurality of control signals to control the read and write of data to the RAM array;
a data terminal to input data to be written in the RAM array and to output data read from the RAM array;
an address terminal to input an address signal to specify an address of the RAM array; and
a control unit operable to perform memory access corresponding to the control signals inputted into the control terminals, to a memory cell in the RAM array specified by the address signal inputted into the address terminal,
wherein the control unit performs the memory access, when the control signals at a high level are inputted into the control terminals, and stops the memory access, when the control signals at a low level are inputted into the control terminals.

12. The semiconductor device according to claim 11, wherein the control unit comprises:
a logic circuit operable to generate a signal of an inverted logical level of the control signal inputted into the control terminal; and
a memory control circuit operable to perform the memory access when a signal generated by the logic circuit is at a low level, and operable to stop the memory access when a signal generated by the logic circuit is at a high level.

13. The semiconductor device according to claim 12, wherein the control terminal includes:
a write enable terminal to input a signal to enable write of data to the nonvolatile RAM array;
an output enable terminal to input a signal to enable read of data from the nonvolatile RAM array;
a byte enable terminal to input a signal to enable a byte access; and
a chip enable terminal to input a signal to enable selection of the semiconductor device concerned.

* * * * *